(12) United States Patent
Li et al.

(10) Patent No.: US 8,022,678 B2
(45) Date of Patent: Sep. 20, 2011

(54) POWER SUPPLY DEVICE

(75) Inventors: Mingzhu Li, Taipei (TW); Qinglin Zhao, Taipei (TW); Zhihong Ye, Taipei (TW); Chunlin Zhang, Taipei (TW); Xuezheng Ding, Taipei (TW)

(73) Assignees: Silitek Electronic (Guangzhou) Co., Ltd., Guangzhou (CN); Lite-On Technology Corp., Taipei (TW)

( * ) Notice: Subject to any disclaimer, the term of this patent is extended or adjusted under 35 U.S.C. 154(b) by 10 days.

(21) Appl. No.: 12/748,713

(22) Filed: Mar. 29, 2010

(65) Prior Publication Data

US 2011/0089913 A1 Apr. 21, 2011

(30) Foreign Application Priority Data

Oct. 15, 2009 (CN) .......................... 2009 1 0193158

(51) Int. Cl.
*G05F 5/00* (2006.01)
(52) U.S. Cl. ...................................................... 323/207
(58) Field of Classification Search .................. 323/207, 323/272; 363/44
See application file for complete search history.

(56) References Cited

U.S. PATENT DOCUMENTS 3,959,720 A * 5/1976 Bose et al. ..................... 323/207
* cited by examiner

*Primary Examiner* — Shawn Riley
(74) *Attorney, Agent, or Firm* — Rosenberg, Klein & Lee

(57) ABSTRACT

A power supply device includes first and second power factor correctors, and first and second resonant circuits. The first and second power factor correctors are for receiving an alternating current (AC) input voltage, and are driven by first and second driving signals for rectifying the AC input voltage to generate first and second driving voltages, respectively. The first and second resonant circuits are coupled to the first and second power factor correctors for receiving the first and second driving voltages, respectively, and have output sides that are coupled in parallel for outputting an output voltage. The first power factor corrector and the first resonant circuit in combination is parallel-connected to the second power factor corrector and the second resonant circuit in combination.

10 Claims, 7 Drawing Sheets

POWER SUPPLY DEVICE

CROSS-REFERENCE TO RELATED APPLICATION

This application claims priority of Chinese Application No. 200910193158.4, filed on Oct. 15, 2009.

BACKGROUND OF THE INVENTION

1. Field of the Invention

The present invention relates to a power supply device, more particularly to a power supply device that employs resonant converting circuits.

2. Description of the Related Art

Resonant converters are known to have advantages such as high conversion efficiency and low cost, and are hence commonly used in high-power isolated DC/DC conversion. Nevertheless, because resonant converters operate on sinusoidal current waveforms, output current after rectifier always has high ripple factor. Especially for applications that require high output power, a plurality of parallel-connected capacitors are required to meet requirements of ripple factor and voltage stress. Conventional technique for reducing ripple factor of LLC converters is to realize phase-shifting output currents of parallel-connected resonant converters. However, resonant converters are controlled through frequency modulation and cannot be controlled through control technique of pulse-width-modulation (PWM) type DC/DC converters. Therefore, control of parallel-connected resonant converters to achieve low ripple and uniform current output has been a difficulty.

Referring to FIG. 1, a conventional power supply device 900 includes a first resonant circuit 91 and a second resonant circuit 92 that are coupled in parallel and that provide an output voltage $V_O$. The conventional power supply device 900 has a current control loop and a voltage control loop.

The current control loop is for determining an optimal operating frequency at which the first and second resonant circuits 91, 92 operate. The current control loop includes a subtractor 96 and a load-balancing controller 97. The subtractor 96 generates a signal corresponding to a difference between output currents $I_{OA}$, $I_{OB}$ of the first and second resonant circuits 91, 92. The load-balancing controller 97 generates a driving signal, according to the signal generated by the subtractor 96, for controlling switching frequency of power switches (not shown) in the first and second resonant circuits 91, 92, thereby controlling the output currents $I_{OA}$, $I_{OB}$.

The voltage control loop is for stabilizing the output voltage $V_O$ of the first and second resonant circuits 91, 92. The voltage control loop includes a voltage controller 93 that samples the output voltage $V_O$, that generates a control signal (D) corresponding to the output voltage $V_O$, and that provides the control signal (D) to a buck converter 94 so as to control switching frequency of a power switch unit (not shown) therein. The power switch unit in the buck converter 94 is controlled in a manner that the buck converter 94 converts the output voltage from a power factor corrector 95 into an input voltage, which is provided to the first and second resonant circuits 91, 92, such that the first and second resonant circuits 91, 92 provide a required output voltage $V_O$.

Nonetheless, the conventional control method requires sampling of the output currents $I_{OA}$, $I_{OB}$ of the first and second resonant circuits 91, 92, and is therefore difficult to implement. Furthermore, the buck converter 94 reduces power conversion efficiency of the power supply device 900. Moreover, the conventional control method requires that an optimal operating frequency (frequency at which gains of the first and second resonant circuits 91, 92 are substantially identical) be determined such that the output currents $I_{OA}$, $I_{OB}$ are balanced, which can be difficult to achieve and is unfavorable in optimizing efficiency of the first and second resonant circuits 91, 92.

SUMMARY OR THE INVENTION

Therefore, an object of the present invention is to provide a power supply device capable of achieving low ripple and uniform current output.

Accordingly, a power supply device of the present invention is adapted to achieve such objective, to receive an input alternating current (AC) voltage, and to generate an output voltage. The power supply device includes a first power factor corrector, a second power factor corrector, a first resonant circuit, and a second resonant circuit.

The first power factor corrector is for receiving the AC input voltage, and is driven by a first driving signal for rectifying the AC input voltage to generate a first driving voltage.

The second power factor corrector is for receiving the AC input voltage and is driven by a second driving signal for rectifying the AC input voltage to generate a second driving voltage.

The first resonant circuit is coupled to the first power factor corrector for receiving the first driving voltage, and is operable to generate the output voltage.

The second resonant circuit is coupled to the second power factor corrector for receiving the second driving voltage, and is operable to generate the output voltage. The output sides of the first and second resonant circuits are coupled in parallel.

Preferably, the power supply device further includes a current regulating circuit coupled to the first power factor corrector for generating the first and second driving signals according to the first driving voltage. The first driving signal is provided to the first power factor corrector and the second driving signal is provided to the second power factor corrector so as to stabilize the first driving voltage and regulate the second driving voltage.

Preferably, when the first and second power factor correctors are configured to operate in one of a discontinuous conduction mode and a critical conduction mode, the current regulating circuit includes a first voltage regulator and a first phase-shifting circuit. The first voltage regulator is coupled to the first power factor corrector for generating the first driving signal according to the first driving voltage, and for providing the first driving signal to the first power factor corrector. The first phase-shifting circuit is coupled to the first voltage regulator for receiving the first driving signal, and for generating the second driving signal by phase-shifting the first driving signal by a predetermined angle. The first phase-shifting circuit is further coupled to the second power factor corrector for providing the second driving signal to the second power factor corrector.

Preferably, when the first and second power factor correctors are configured to operate in a continuous conduction mode, the current regulating circuit includes a voltage controller, a first subtractor, a first current regulator, a second subtractor, and a second current regulator. Each of the first and second power factor correctors includes a storage inductor.

The voltage controller is coupled to the first power factor corrector for generating first and second reference currents according to the first driving voltage.

The first subtractor is coupled to the voltage controller and the first power factor corrector for generating a first error current according to a difference between the first reference current and inductor current of the storage inductor of the first power factor corrector.

The first current regulator is coupled to the first subtractor for generating the first driving signal according to the first error current. The first current regulator is further coupled to the first power factor corrector for providing the first driving signal to the first power factor corrector.

The second subtractor is coupled to the voltage controller and the second power factor corrector for generating a second error current according to a difference between the second reference current and inductor current of the storage inductor of the second power factor corrector.

The second current regulator is coupled to the second subtractor for generating the second driving signal according to the second error current. The second current regulator is further coupled to the second power factor corrector for providing the second driving signal to the second power factor corrector.

Preferably, the power supply device further includes a voltage stabilizing circuit coupled to the first and second resonant circuits for generating first and second control signals according to the output voltage, and for providing each of the first and second control signals to a respective one of the first and second resonant circuits so as to stabilize the output voltage.

Preferably, the voltage stabilizing circuit includes a second voltage regulator and a second phase-shifting circuit.

The second voltage regulator is coupled to the first resonant circuit for generating the first control signal according to the output voltage, and for providing the first control signal to the first resonant circuit.

The second phase-shifting circuit is coupled to the second voltage regulator for receiving the first control signal, and for generating the second control signal by phase-shifting the first control signal by a predetermined angle. The second phase-shifting circuit is further coupled to the second resonant circuit for providing the second control signal to the second resonant circuit.

The power supply device of the present invention stabilizes the first driving voltage and regulates the second driving voltage according to a difference between the first and second driving voltages so as to achieve uniform current output.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
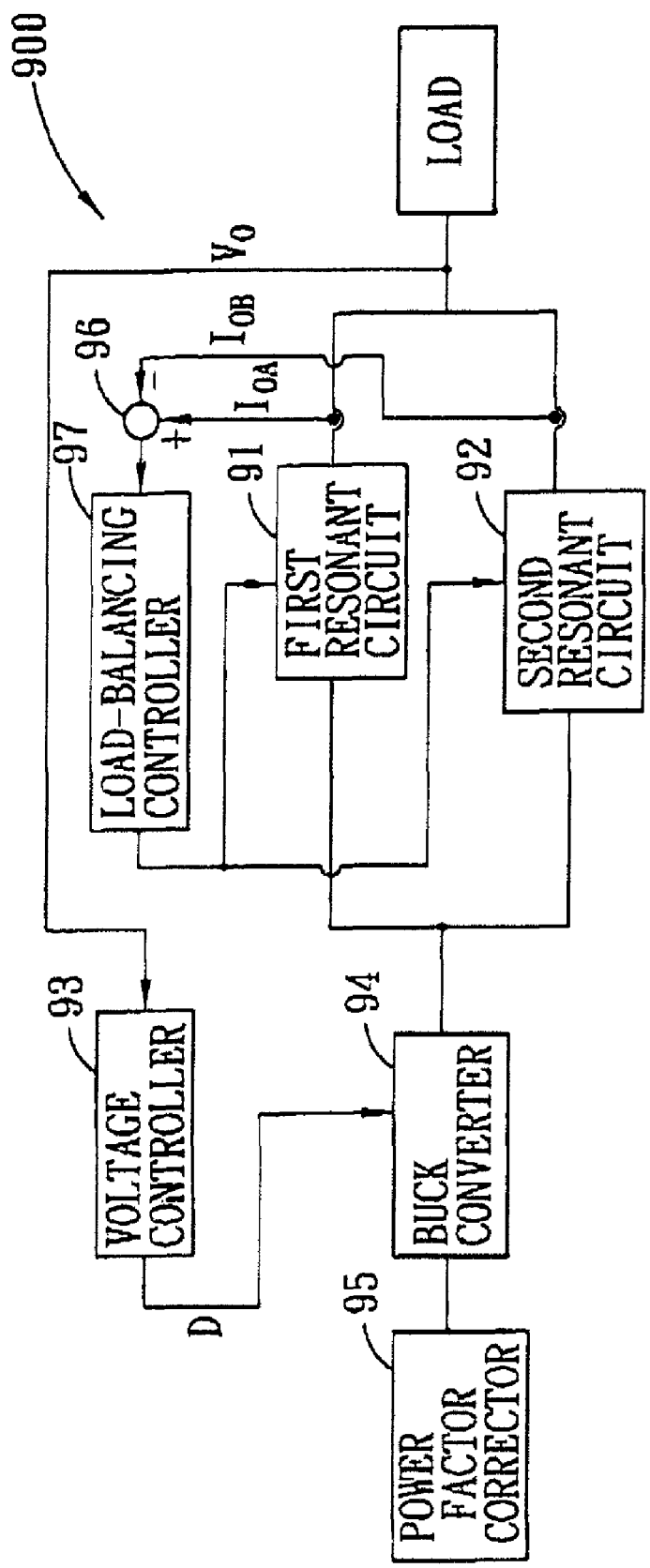
FIG. 1 is a schematic circuit block diagram of a conventional power supply device.

Before the present invention is described in greater detail, it should be noted that the same elements are denoted by the same reference numerals throughout the disclosure.

Figure 2:
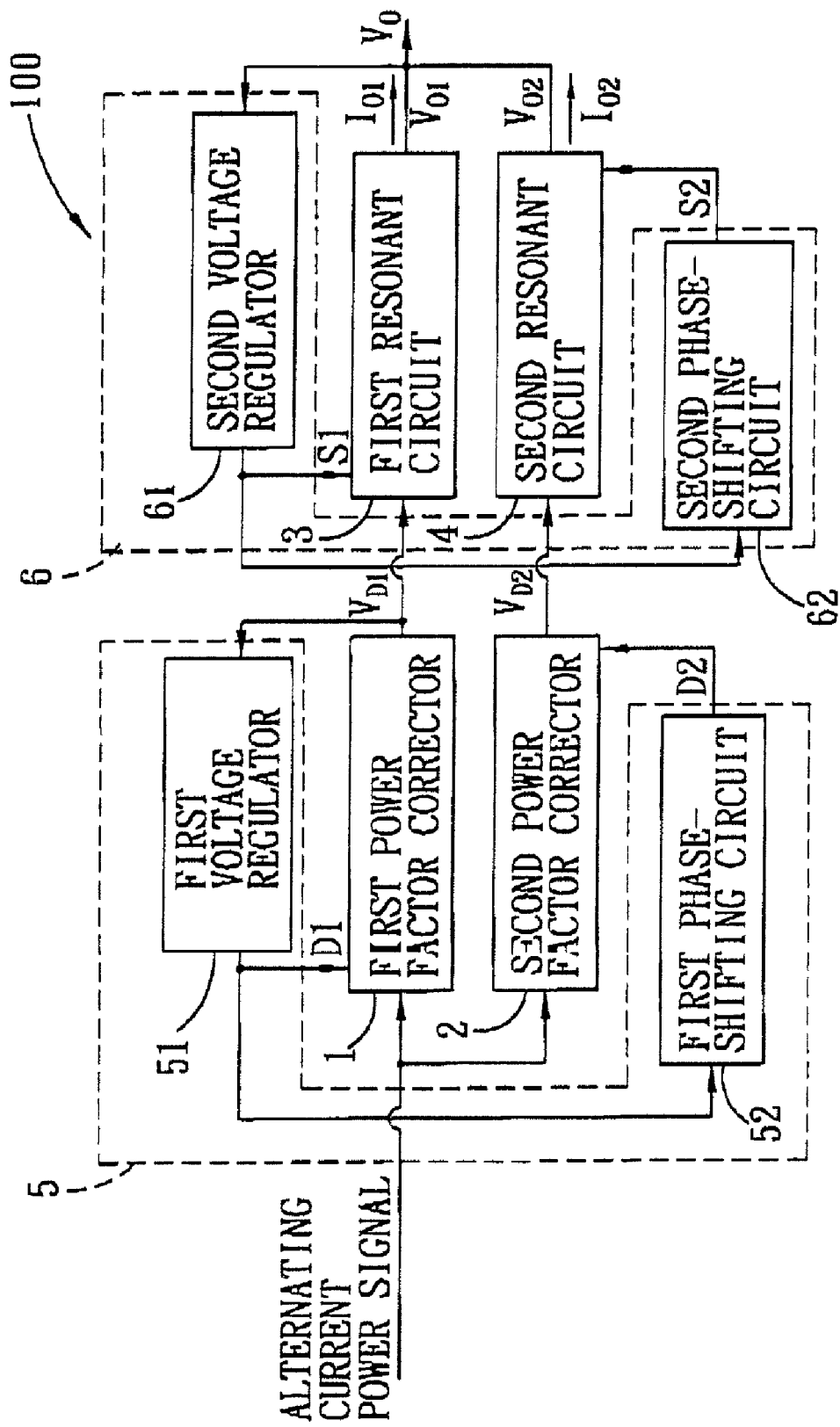
FIG. 2 is a schematic circuit block diagram of the first preferred embodiment of a power supply device according to the present invention.

Referring to FIG. 2, a power supply device 100 of the first preferred embodiment of the present invention is capable of providing a stable output voltage $V_O$ and achieving a uniform current output. The power supply device 100 is used mainly in applications such as servers, workstations, telecommunication devices, desktop computers, gaming consoles, flat panel televisions, and distributed power systems. The power supply device 100 includes a first power factor corrector 1, a second power factor corrector 2, a first resonant circuit 3, a second resonant circuit 4, a current regulating circuit 5, and a voltage stabilizing circuit 6.

The first and second power factor correctors 1, 2 have input sides thereof coupled in parallel and receiving an alternating current (AC) input voltage. The AC input voltage is received from a commercial AC power line. The first and second power factor correctors 1, 2 rectify the AC input voltage and output first and second driving voltages $V_{D1}$, $V_{D2}$, respectively. In the present embodiment, the first and second power factor correctors 1, 2 operate in a discontinuous conduction mode or a critical conduction mode.

The first and second resonant circuits 3, 9 can be LC parallel/series-connected resonant converters or LLC parallel/series-connected resonant converters. Each of the first and second resonant circuits 3, 4 is coupled to a respective one of the first and second power factor correctors 1, 2 for receiving a respective one of the first and second driving voltages $V_{D1}$ $V_{D2}$ and for converting the respective one of the first and second driving voltages $V_{D1}$ $V_{D2}$ into the output voltage $V_O$. The first and second resonant circuits 3, 4 have output sides thereof coupled in parallel and providing the output voltage $V_O$.

The current regulating circuit 5 is coupled to the first and second power factor correctors 1, 2 for stabilizing the first driving voltage $V_{D1}$ and regulating the second driving voltage $V_{D2}$ so as to balance output currents of the first and second power factor correctors 1, 2 such that the first and second resonant circuits 3, 4 generate first and second output currents $I_{O1}$, $I_{O2}$ that are substantially identical.

In the present embodiment, the current regulating circuit 5 generates first and second driving signals D1, D2 according to the first driving voltage $V_{D1}$, and provides each of the first and second driving signals D1, D2 to the respective one of the first and second power factor correctors 1, 2 so as to drive operations of the same. The current regulating circuit 5 includes a first voltage regulator 51 and a first phase-shifting circuit 52.

The first voltage regulator 51 is coupled to the first power factor corrector 1 for generating the first driving signal D1 according to the first driving voltage $V_{D1}$, and for providing the first driving signal D1 to the first power factor corrector 1. The first driving signal D1 is a digital pulse signal and controls switching of a power switch (not shown) of the first power factor corrector 1, thereby stabilizing the first driving voltage $V_{D1}$.

The phase-shifting circuit 52 is coupled to the first voltage regulator 51 for receiving the first driving signal D1, and for generating the second driving signal D2 by phase-shifting the first driving signal D1 by a predetermined angle. The phase-shifting circuit 52 is further coupled to the second power factor corrector 2 for providing the second driving signal D2 to the second power factor corrector 2. The second driving signal D2 is also a digital pulse signal and controls switching of a power switch (not shown) of the second power factor corrector 2, thereby regulating the second driving voltage $V_{D2}$. In the present embodiment, the first and second driving signals D1, D2 are substantially identical and have a 180-degree phase difference. However, phase difference between the first and second driving signals D1, D2 may be adjusted according to need.

Since the combination of the first power factor corrector 1 and the first resonant circuit 3 is parallel to the combination of the second power factor corrector 2 and the second resonant circuit 4, and since the first and second driving signals D1, D2 are substantially identical, the output power generated by the first and second resonant circuits 3, 4 can be substantially identical.

In other words, when gain of the first resonant circuit 3 is greater than that of the second resonant circuit 4, output power of the first resonant circuit 3 is greater than that of the second resonant circuit 4 such that the first resonant circuit 3 is a greater load on the first power factor corrector 1 as compared to the second resonant circuit 4 on the second power factor corrector 2. However, the first driving voltage $V_{D1}$ is stabilized through the first voltage regulator 51, which causes the second driving voltage $V_{D2}$ to increase due to the running mode of the power factor corrector 1 and 2. Subsequently, the second output current $I_{O2}$ is increased, thereby compensating for the effect of gain difference of the first and second resonant circuits 3, 4 to achieve uniform current output.

The following description is provided to prove that the first and second output currents $I_{O1}$, $I_{O2}$ of the first and second resonant circuits 3,4 affect variation of the first and second driving voltages $V_{D1}$, $V_{D2}$. Since the first and second power factor correctors 1, 2 have the same circuit configuration and operate in a same operating mode, the following description applies to either of the first and second power factor correctors 1, 2.

Figure 3:
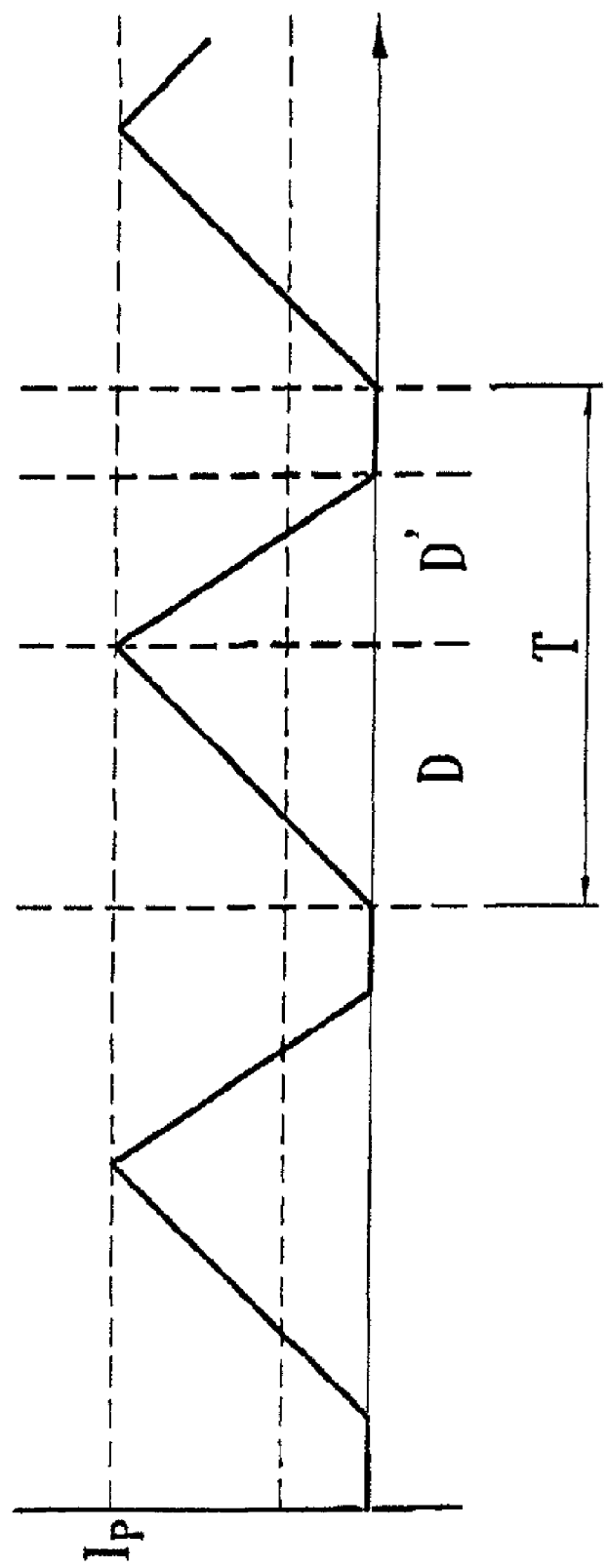
FIG. 3 is a timing diagram illustrating output current of one of first and second power factor correctors that are configured to operate in a discontinuous conduction mode.

Assume that the first power factor corrector 1 operates in the discontinuous conduction mode. Referring to FIG. 3, the relation between the input voltage and the output voltage is defined by formula 1:

$$V_O = \frac{V_{in} \cdot (D+D')}{D'} \quad (1)$$

wherein, $V_{in}$ and $V_O$ are the input voltage and output voltage of the first power factor corrector 1, respectively. D is the duty cycle of the first driving signal D1.

In each cycle T of the first driving signal D1, the peak input current $I_p$ and average input current $I_{avein}$ are defined by formulae 2 and 3, respectively:

$$I_P = \frac{V_{in} \cdot DT}{L} \quad (2)$$

$$I_{avein} = \frac{1}{2} I_P \cdot (D+D') \quad (3)$$

wherein, L is the inductance of a storage inductor of the first power factor corrector 1.

Substituting formula 2 into formula 3 to derive formula 4:

$$I_{avein} = \frac{V_{in} \cdot T}{2L} \cdot D(D+D') \quad (4)$$

Finally, substituting formula 4 into formula 1 to derive formula 5:

$$V_O = \frac{V_{in}}{1 - \frac{V_{in} \cdot T \cdot D^2}{2 \cdot L \cdot I_{avein}}} \quad (5)$$

It is to be noted that the output voltage $V_O$ of the first power factor corrector 1 is the first driving voltage $V_{D1}$, and it is assumed that the input voltage $V_{in}$ of the first power factor corrector 1, the duty cycle D and period T of the first driving signal D1, and the inductance L of the storage inductor of the first power factor corrector 1 have fixed values. Therefore, when gain of the first resonant circuit 3 is smaller than that of the second resonant circuit 4, the first output current $I_{O1}$ is smaller than the second output current $I_{O2}$. That is to say, the average output current of the first power factor corrector 1 is smaller than that of the second power factor corrector 2. According to formula 5, the first driving voltage $V_{D1}$ will be larger than the second driving voltage $V_{D2}$, thereby increasing the first output current $I_{O1}$, of the first resonant circuit 3 and decreasing the second output current $I_{O2}$ of the second resonant circuit 4. Thus, the power supply device 100 is capable of achieving uniform current output.

It is to be noted that although the present embodiment employs two resonant circuits (i.e., the first and second resonant circuits 3, 4) with output sides thereof connected in parallel to provide the output voltage $V_O$, the number of resonant circuits may be changed in other embodiments of the present invention according to need.

Figure 4:
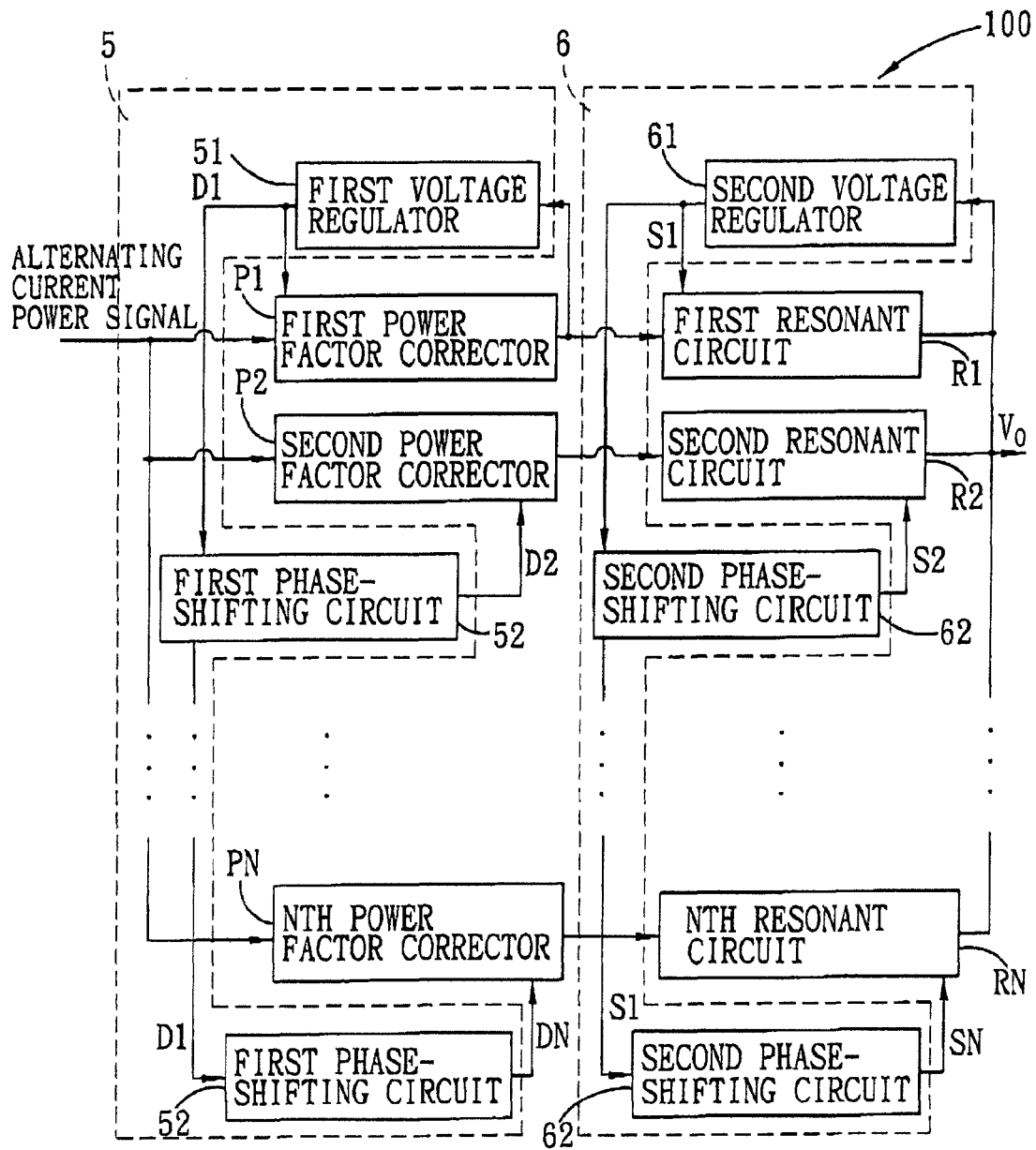
FIG. 4 is a schematic circuit block diagram of the second preferred embodiment of a power supply device according to the present invention, which includes multiple resonant circuits with output sides thereof coupled in parallel.

Referring to FIG. 4, the second preferred embodiment of a power supply device 100 according to the present invention is similar to the first preferred embodiment in function and circuit functional block relations, but employs N (N≧2) resonant circuits R1-RN, N power factor correctors P1-PN, and a current regulating circuit 5 that includes a first voltage regulator 51 and N−1 first phase-shifting circuits 52. Each of the N power factor correctors P1-PN is coupled to a respective one of the N resonant circuits R1-RN. The resonant circuits R1-RN have output sides thereof coupled in parallel. The first voltage regulator 51 is coupled to the first power factor corrector D1 to generate and provide a first driving signal D1.

It is to be noted that the N−1 first phase-shifting circuits 52 generate N−1 driving signals D2-DN by phase-shifting the first driving signal D1 by different multiples of 360/N degrees, and provide the N−1 driving signals D2-DN to the N−1 power factor correctors P2-PN. For example, if a power supply device 100 of another embodiment employs three resonant circuits S1, S2, S3 and three corresponding power factor correctors P1, P2, P3, driving signals D2, D3 will have phase shifts of 120° and 240°.

It is further noted that the current regulating circuit 5 of the power supply device 100 of the first preferred embodiment may be modified to omit the first phase-shifting circuit 52. That is to say, the first voltage regulator 51 provides the first driving signal D1 to the first and second power factor correctors 1, 2. However, the power supply device 100 will still be able to achieve uniform current output, as long as the combination of the first power factor corrector 1 and the first resonant circuit 3 are coupled in parallel to the combination of the second power factor corrector 2 and the second resonant circuit 4.

Referring again to FIG. 2, the power supply device 100 further includes a voltage stabilizing circuit 6 coupled to the first and second resonant circuits 3, 4 for stabilizing the output voltage $V_O$ thereof. The voltage stabilizing circuit 6 includes a second voltage regulator 61 and a second phase-shifting circuit 62.

The second voltage regulator 61 is coupled to the first resonant circuit 3 for generating a first control signal S1 according to the output voltage $V_O$. The first control signal S1 is a digital pulse-wave signal, and is for driving switching of a power switch (not shown) of the first resonant circuit 3, thereby stabilizing the output voltage $V_O$ generated by the first resonant circuit 3.

The second phase-shifting circuit 62 is coupled to the second voltage regulator 61 for receiving the first control signal S1, and generating a second control signal S2 by phase-shifting the first control signal S1 by a predetermined angle. The second control signal S2 is also a digital pulse-wave signal, and is for driving switching of a power switch (not shown) of the second resonant circuit 4. In the present embodiment, the first and second control signals S1, S2 have a 90-degree phase difference, but in other embodiments, the first and second control signals S1, S2 may have a different phase difference.

Referring once more to FIG. 4, similarly, the voltage stabilizing circuit 6 of the power supply device 100 of the second preferred embodiment includes a second voltage regulator 61 and N−1 second phase-shifting circuits 62. The N−1 second phase-shifting circuits 62 are coupled to the second voltage regulator 61 for generating N−1 control signals S2-SN by phase-shifting the first control signal S1 by different multiples of 180/N degrees, and are coupled to the N−1 resonant circuits R2-RN for providing the N−1 control signals S2-SN thereto. In other words, if a power supply device 100 of another embodiment employs three resonant circuits S1, S2, S3 and three corresponding power factor correctors P1, P2, P3, control signals S2, S3 will have phase shifts of 60° and 120°.

Figure 5:
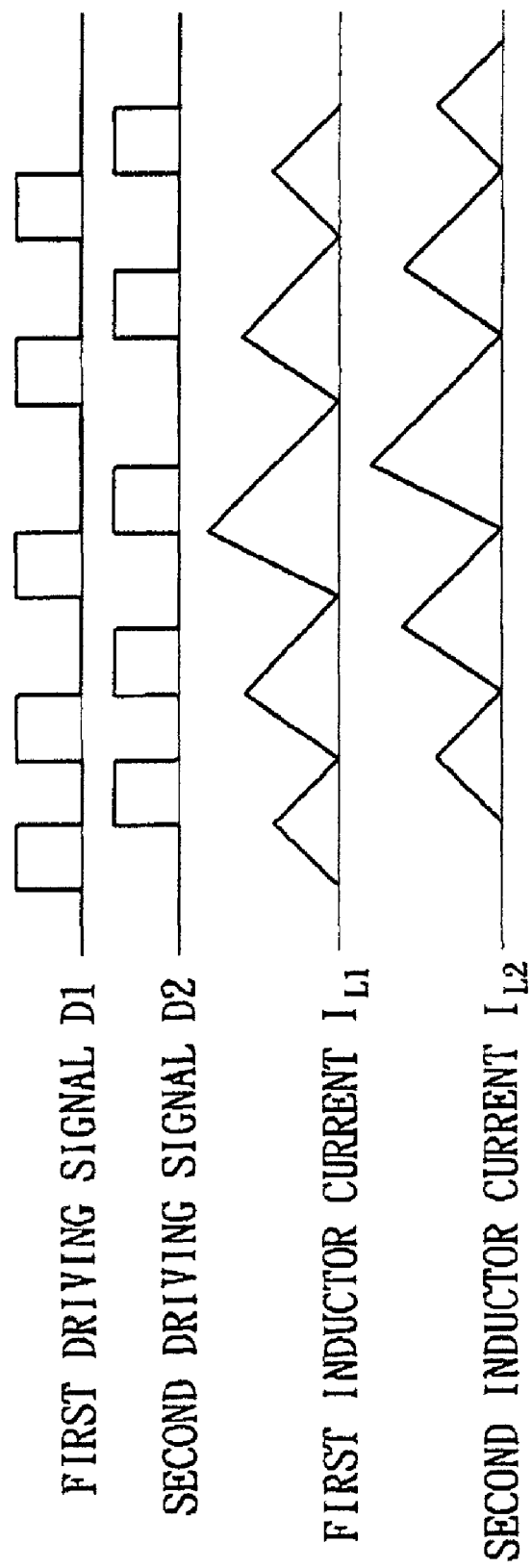
FIG. 5 is a timing diagram illustrating first and second driving signals and first and second inductor currents when the first and second power factor correctors are configured to operate in a critical conduction mode.

FIG. 5 is a timing diagram corresponding to the first preferred embodiment, and illustrating the first and second driving signals D1, D2 and first and second inductor currents $I_{L1}$, $I_{L2}$ when the first and second power factor correctors 1, 2 are configured to operate in a critical conduction mode (CDM). Each of the first and second inductor currents $I_{L1}$, $I_{L2}$ is a current that flows through a storage inductor (not shown) of a respective one of the first and second power factor correctors 1, 2. The first and second driving signals D1, D2 have a 180-degree phase difference.

Figure 6:
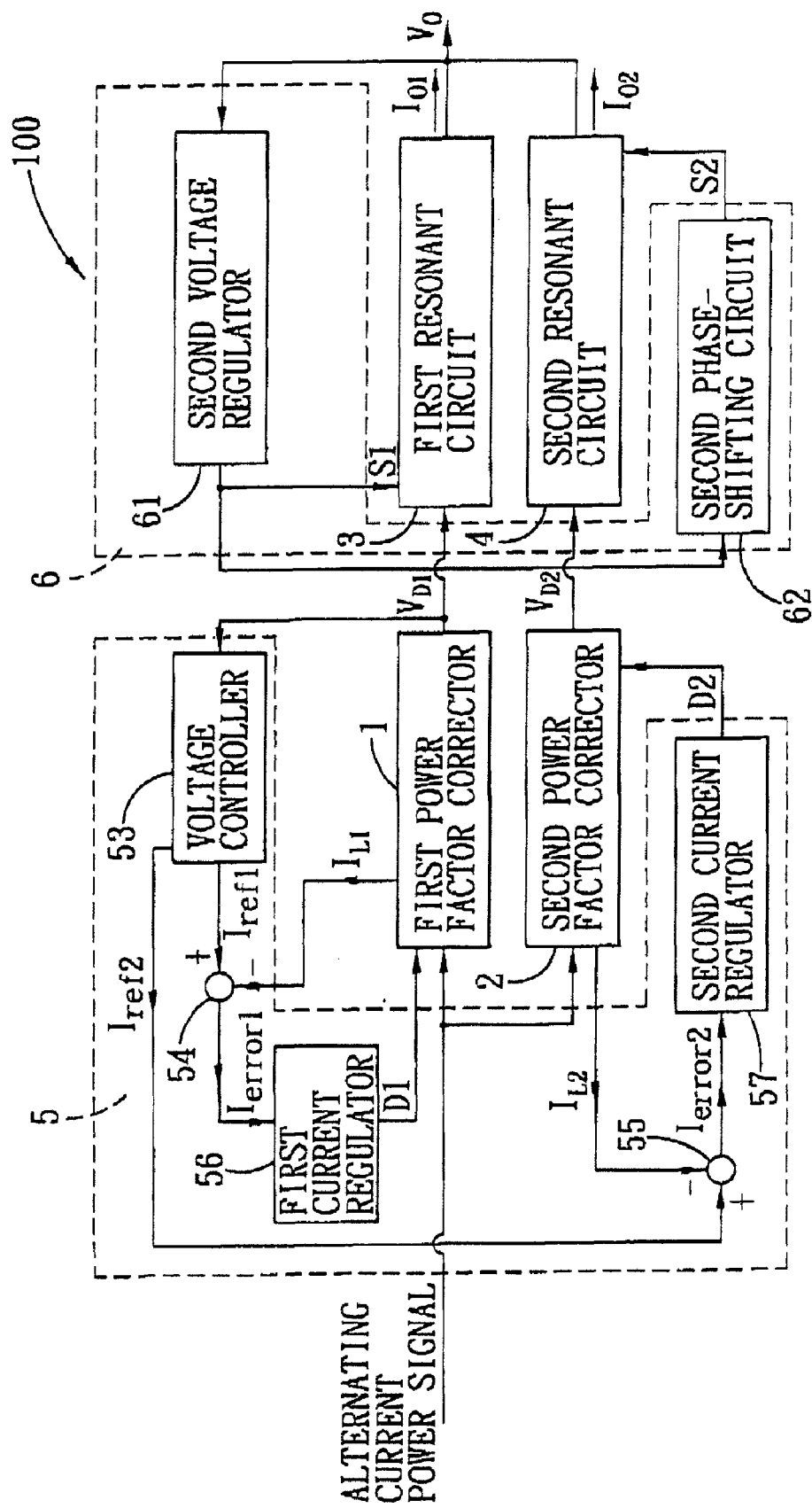
FIG. 6 is a schematic circuit block diagram of the third preferred embodiment of a power supply device according to the present invention.

Referring to FIG. 6, the third preferred embodiment of a power supply device 100 according to the present invention is similar to the first preferred embodiment, but has first and second power factor correctors 1, 2 that operate in a continuous conduction mode, and a current regulating circuit 5 of this embodiment includes a voltage controller 53, a first subtractor 54, a second subtractor 55, a first current regulator 56, and a second current regulator 57.

The voltage controller 53 is coupled to the first power factor corrector 1 for generating first and second reference currents $I_{ref1}$, $I_{ref2}$ according to the first driving voltage $V_{D1}$. The first subtractor 54 is coupled to the first power factor corrector 1 and the voltage controller 53 for generating a first error current $I_{error1}$ according to a difference between the first reference current $I_{ref1}$ and the first inductor current $I_{L1}$. The second subtractor 55 is coupled to the second power factor corrector 2 and the voltage controller 53 for generating a second error current $I_{error2}$ according to a difference between the second reference current $I_{ref2}$ and the second inductor current $I_{L2}$.

The first current regulator 56 is coupled to the first subtractor 54 for generating a first driving signal D1 according to the first error signal $I_{error1}$ and is further coupled to the first power factor corrector 1 for providing the first driving signal D1 so as to drive operation of the first power factor corrector 1. The second current regulator 57 is coupled to the second subtractor 55 for generating a second driving signal D2 according to the second error signal $I_{error2}$, and is further coupled to the second power factor corrector 2 for providing the second driving signal D2 so as to drive operation of the second power factor corrector 2.

Since the first and second power factor correctors 1, 2 operate in the continuous conduction mode, the second driving voltage $V_{D2}$ can not vary with the variation of the output power of the first and second resonant circuits 3, 4 automatically. Therefore, in the third preferred embodiment, the current regulating circuit 5 generates the first and second reference currents $I_{ref1}$, $I_{ref2}$ according to the first driving voltage $V_{D1}$, and achieves uniform current output by regulating the first and second driving signals D1, D2 according to the difference between the first inductor current $I_{L1}$ and the first reference current $I_{ref1}$, and the difference between the second inductor current $I_{L2}$ and the second reference current $I_{ref2}$, respectively.

Figure 7:
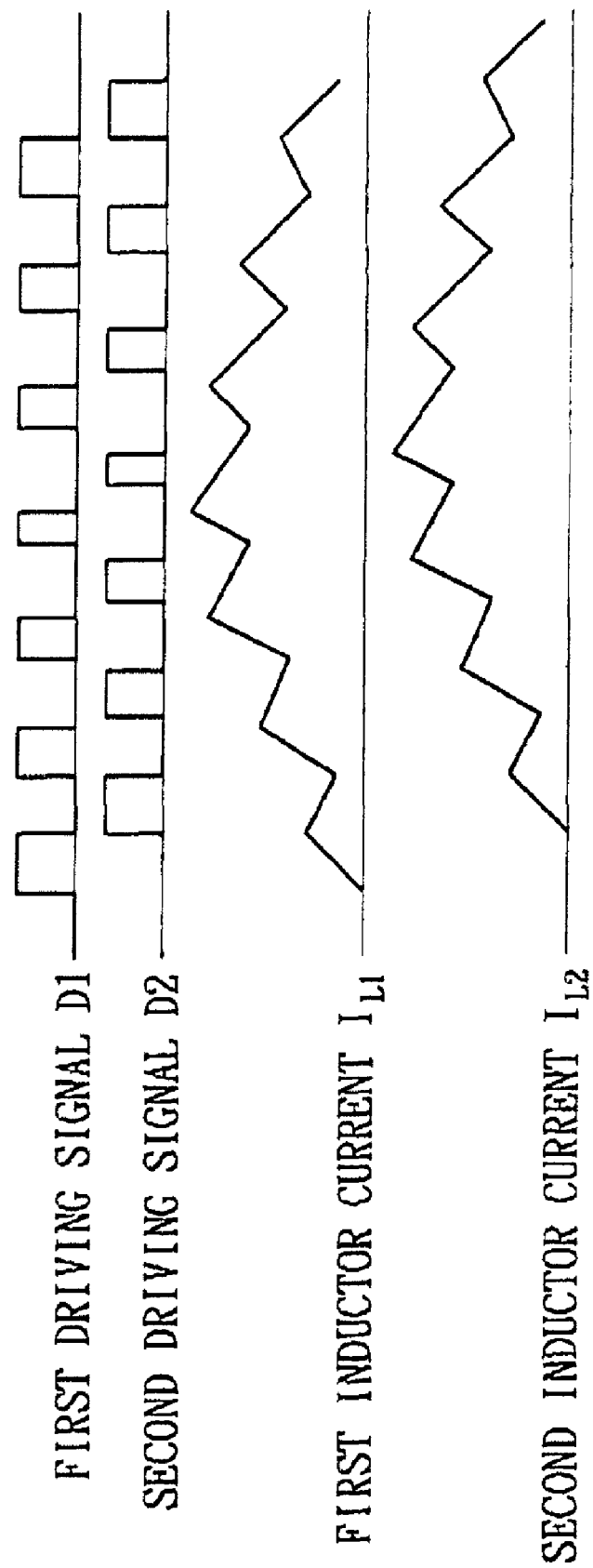
FIG. 7 is a timing diagram illustrating the first and second driving signals and the first and second inductor currents when the first and second power factor correctors are configured to operate in a continuous conduction mode.

FIG. 7 is a timing diagram corresponding to the third preferred embodiment, and illustrating the first and second driving signals D1, D2 and the first and second inductor currents $I_{L1}$, $I_{L2}$ when the first and second power factor correctors 1, 2 are configured to operate in the continuous conduction mode. The first and second driving signals D1, D2 have a 180-degree phase difference.

In summary, the power supply device 100 of this invention includes the combination of the first power factor corrector 1 and the first resonant circuit 3 that is coupled in parallel to the combination of the second power factor corrector 2 and the second resonant circuit 4. The input sides of the first and second power factor correctors 1, 2 are coupled to receive the same AC input voltage, and the output sides of the first and second resonant circuits 3, 4 are coupled to provide the output voltage $V_O$. Thus, uniform current output can be achieved by regulating the first and second power factor correctors 1, 2 through controlling the first and second driving signals D1, D2.

What have been described above are considered to be the most practical and preferred embodiments of the present invention. It is understood that this invention is not limited to the disclosed embodiments but is intended to cover various arrangements included in the spirit and scope of the broadest interpretation, so as to encompass all such modifications and equivalent arrangements.

What is claimed is:

1. A power supply device adapted for receiving an alternating current (AC) input voltage and generating an output voltage, said power supply device comprising:

a first power factor corrector for receiving the AC input voltage and driven by a first driving signal for rectifying the AC input voltage to generate a first driving voltage;

a second power factor corrector for receiving the AC input voltage and driven by a second driving signal for rectifying the AC input voltage to generate a second driving voltage;

a first resonant circuit coupled to said first power factor corrector for receiving the first driving voltage, operable to generate the output voltage, and having an output side for outputting the output voltage; and a second resonant circuit coupled to said second power factor corrector for receiving the second driving voltage, operable to generate the output voltage, and having an output side for outputting the output voltage, wherein said output sides of said first and second resonant circuits are coupled in parallel to each other.

2. The power supply device as claimed in claim 1, further comprising a current regulating circuit coupled to said first power factor corrector for generating the first and second driving signals according to the first driving voltage, said current regulating circuit being further coupled to said second power factor corrector, and providing each of the first and second driving signals to a respective one of said first and second power factor correctors so as to stabilize the first driving voltage and regulate the second driving voltage.

3. The power supply device as claimed in claim 2, wherein said current regulating circuit includes a first voltage regulator coupled to said first power factor corrector for generating the first driving signal according to the first driving voltage, and for providing the first driving signal to said first power factor corrector, and a first phase-shifting circuit coupled to said first voltage regulator for receiving the first driving signal and for generating the second driving signal by phase-shifting the first driving signal by a predetermined angle, said first phase-shifting circuit being further coupled to said second power factor corrector for providing the second driving signal to said second power factor corrector.

4. The power supply device as claimed in claim 3, wherein said first and second power factor correctors are configured to operate in one of a discontinuous conduction mode and a critical conduction mode.

5. The power supply device as claimed in claim 4, wherein said first and second power factor correctors operate such that the first driving voltage is smaller than the second driving voltage when gain of said first resonant circuit is larger than that of said second resonant circuit to result in uniform currents outputted by said first and second resonant circuits.

6. The power supply device as claimed in claim 4, wherein said first and second power factor correctors operate such that the first driving voltage is larger than the second driving voltage when gain of said first resonant circuit is smaller than that of said second resonant circuit to result in uniform currents outputted by said first and second resonant circuits.

7. The power supply device as claimed in claim 2, wherein each of said first and second power factor correctors includes a storage inductor, said current regulating circuit including a voltage controller coupled to said first power factor corrector for generating first and second reference currents according to the first driving voltage, a first subtractor coupled to said voltage controller and said first power factor corrector for generating a first error current according to a difference between the first reference current and inductor current of said storage inductor of said first power factor corrector, a first current regulator coupled to said first subtractor for generating the first driving signal according to the first error current, said first current regulator being further coupled to said first power factor corrector for providing the first driving signal to said first power factor corrector, a second subtractor coupled to said voltage controller and said second power factor corrector for generating a second error current according to a difference between the second reference current and inductor current of said storage inductor of said second power factor corrector, and a second current regulator coupled to said second subtractor for generating the second driving signal according to the second error current, said second current regulator being further coupled to said second power factor corrector for providing the second driving signal to said second power factor corrector.

8. The power supply device as claimed in claim 7, wherein said first and second power factor correctors are configured to operate in a continuous conduction mode.

9. The power supply device as claimed in claim 2, further comprising a voltage stabilizing circuit coupled to said first and second resonant circuits for generating first and second control signals according to the output voltage, and for providing each of the first and second control signals to a respective one of said first and second resonant circuits so as to stabilize the output voltage.

10. The power supply device as claimed in claim 9, wherein said voltage stabilizing circuit includes a second voltage regulator coupled to said first resonant circuit for generating the first control signal according to the output voltage, and for providing the first control signal to said first resonant circuit, and a second phase-shifting circuit coupled to said second voltage regulator for receiving the first control signal and for generating the second control signal by phase-shifting the first control signal by a predetermined angle, said second phase-shifting circuit being further coupled to said second resonant circuit for providing the second control signal to said second resonant circuit.

* * * * *